United States Patent Office 3,204,715
Patented Sept. 7, 1965

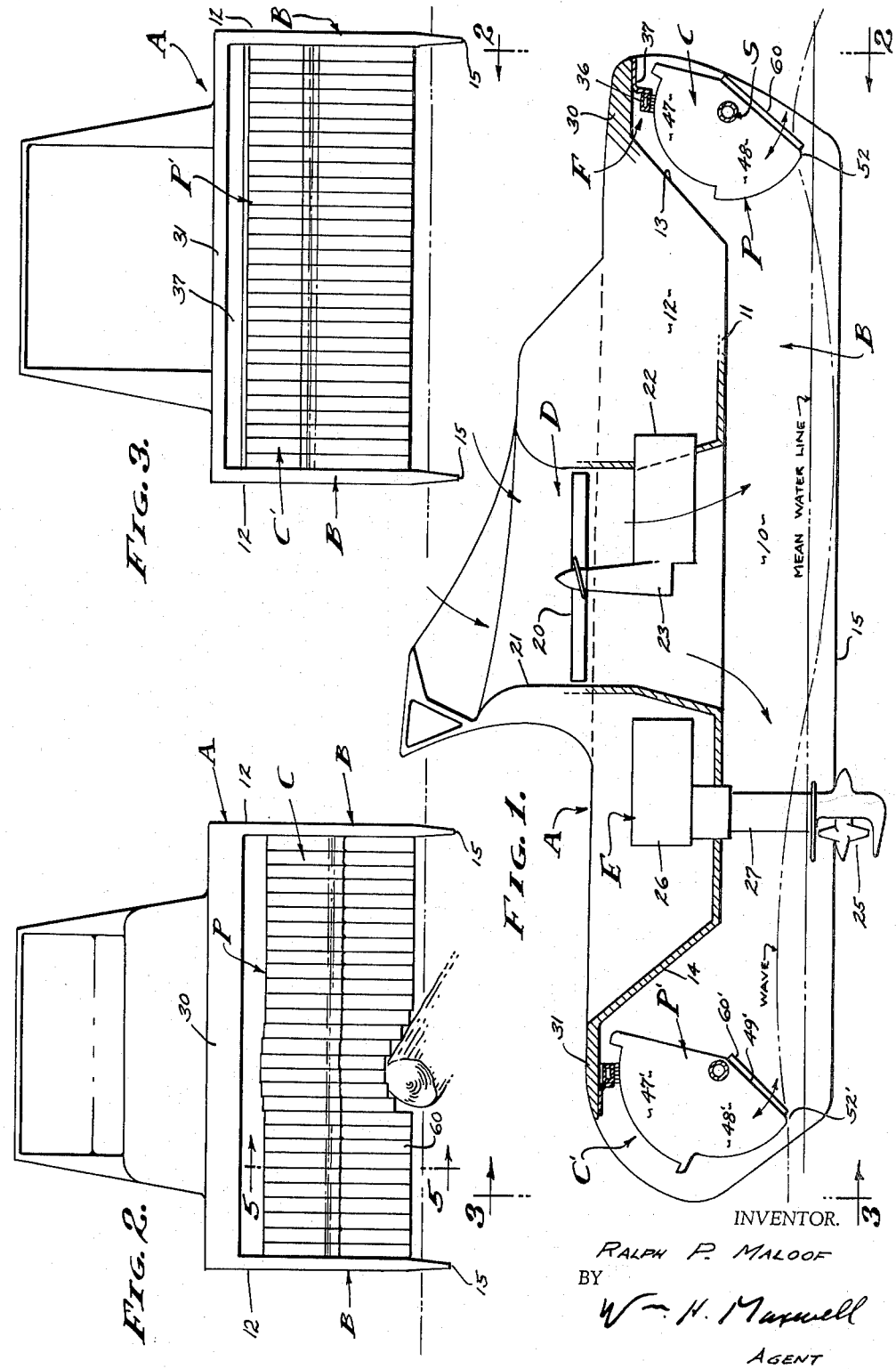

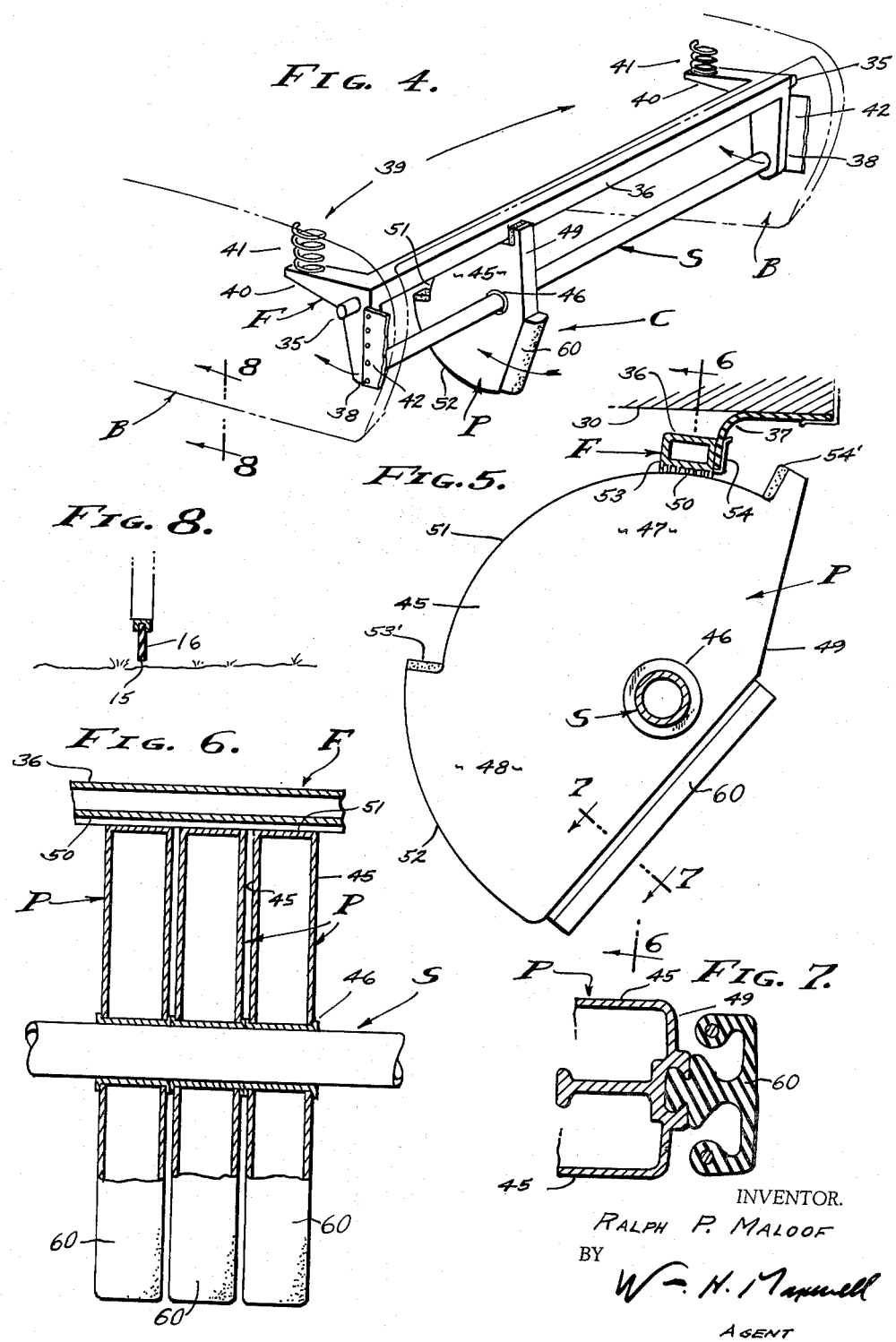

3,204,715
SEAL FOR AIR CUSHION VEHICLES
AND THE LIKE
Ralph P. Maloof, Los Angeles, Calif.
(5261 Whitsett Ave., North Hollywood, Calif.)
Filed Mar. 10, 1961, Ser. No. 94,745
12 Claims. (Cl. 180—7)

This invention relates to air cushion vehicles and it is particularly concerned with a vehicle-to-surface seal for such vehicles or the like, it being a general object of this invention to provide an air flow barrier that is carried by the vehicle and which is operable relative to wide variations in surface contours and such as to successfully encounter obstacles.

Vehicles of the type under consideration are supported by air supplied under pressure to a plenum chamber, it being a primary requisite to reduce leakage from said chamber as much as possible. At very low speeds of movement over the surface a seal is not too great a problem, but as speeds of movement are increased the sealing problem becomes of prime concern. Excessive variations in ground contour and/or water contour requires flexible sealing action and to this end resort has been made to a variety of different means, including flexible curtains and fluid curtains, etc. As yet, however, and to applicant's knowledge and belief has been no satisfactory answer to this special sealing problem.

Generally, since the plenum chamber pressure required to support the vehicle is dictated by its projected area and weight, the air pumping energy is more or less proportioned to the effectiveness of the seal between the vehicle and surface beneath the same. Obviously, it is required to minimize said leakage in order to control and to maintain the supporting air pressure in the plenum chamber. Now, whether operating over solid terrain or over water there are unlimited variations in obstacles to be met with by the seal surrounding the vehicle plenum chamber. Whether on land or on water the seal must successfully encounter waves in the surface, and steps or projecting obstacles that present themselves. By obstacles, I mean to include steps and like abutments that occur on land, and projecting parts of flotsam that occur on water. In other words, the vehicle with its seal must cope with frequent disturbances, irregularities, and with rigid massive obstacles lying in its path of travel.

More specifically, it is the fore and aft ends of a vehicle of the type under consideration that present the major problem. Assuming that the vehicle has substantial width, then a seal must extend transversely at both the front and back thereof, and necessarily normally disposed to the direction of movement. Present day practice requires the seal to extend to within an inch or so of the supporting surface and, therefore, it is desired to provide, generally, an apron of solid substances from the bottom of the vehicle to within an inch or so of said surface. This solid barrier could be a hinged panel permitted to swing away from contact made with an obstacle, but such a seal is impractical since it would be difficult, if not impossible, to balance air pressure forced upon the same. Also, leakage increased when obstacles are met with would render it practically inoperative.

In spite of the inherent difficulties encountered with mechanical seals, it is an object of this invention to provide a mechanical air flow barrier that minimizes the amount of energy required to maintain an air cushion under a vehicle supported thereby, and which approximates the air flow interference that would be afforded by a solid curtain of material, and all without excessive inertia to be overcome in said seal structure.

It is an object of this invention to provide a seal to extend transversely of an air cushion vehicle and that is biased by the air pressure loading to yieldingly adjust itself to proper working position. And, in this respect, it is an object to provide a seal equally applicable to the front as well as to the back of the vehicle.

It is still another object of this invention to provide a seal of the character above referred to that comprises a plurality of cooperatively related elements that move independently of each other and which automatically adjust themselves to surface conditions.

It is also an object of this invention to provide a seal of the character thus far referred to that establishes an effective labyrinth at the front and/or back of the vehicle, all for minimizing the leakage of air from the supporting plenum chamber air pressure.

Further, an object of this invention is to provide a vehicle of the character under consideration that is operable over any surface, terrain or water, and wherein the seals are balanced by dynamic pressure loads to adjust automatically to variations in contour of the supporting surface.

The various objects and features of this invention will be fully understood from the following detailed description of the typical preferred form and application thereof, throughout which description reference is made to the accompanying drawings, in which:

FIG. 1 is a longitudinal sectional view of a typical vehicle of the type under consideration and which embodies the features of the present invention;

FIGS. 2 and 3 are end views taken as indicated by lines 2—2 and 3—3 on FIG. 1; FIG. 4 is a perspective view of a portion of the apparatus with parts removed for clarity of illustration; FIG. 5 is an enlarged detailed sectional view showing the seal element as indicated by line 5—5 on FIG. 2; FIG. 6 is a sectional view taken as indicated by line 6—6 on FIG. 5; FIG. 7 is an enlarged detailed fragmentary view taken as indicated by line 7—7 on FIG. 5; and, FIG. 8 is a sectional view of a modified form of construction and taken as indicated by line 8—8 on FIG. 4.

Basically, the present invention involves the use of a series of depending slats, unique in their individual configuration and balanced by dynamic pressure loads to automatically seek a properly adjusted working position. Leakage is normally controlled by the labyrinth nature of the cooperatively related slats and effectiveness thereof is not adversely affected by relative motion between adjacent sealing element. More specifically, the seal of the present invention is characterized by a plurality of adjacently related sector-shaped elements that are pivoted on a common axis and balanced by air pressure forces. In FIG. 1 of the drawings I have illustrated a typical embodiment of the present invention involving a vehicle having a body A, side walls B defining a plenum chamber 10, a seal C enclosing the front of the chamber 10, a seal C' closing the rear of the chamber 10, means D to pressure the chamber 10, and means E to propel the vehicle.

The vehicle that I have illustrated in FIG. 1 is designed for aquatic use, in which case the body A is a vessel having sufficient displacement to float the structure. The body A is shown as a flat elongate shell having a bottom 11, sides 12, a bow transom 13 and a stern transom 14. The body A can be decked over and provided with suitable passenger and cargo facilities and compartmented for accommodation of the support and propulsion apparatus later described. The body A is rectangular in plan configuration with the transoms 13 and 14 extending transversely and normal to the sides 12. In practice, the transoms 13 and 14 flare forwardly and rearwardly, respectively to clear the moving seal elements later described.

The side walls B, that define the plenum chamber 10, extend longitudinally of the body A and form continuations of the sides 12 and they depend from the bottom 11. There is a side wall B at each of the opposite sides 12 of the body A, said walls B being co-extensive with the length of the sides 12. Each wall B can be formed as a narrow hull or fin shaped extension element of the body A with a straight bottom edge 15 operating below the mean water level. In the case illustrated in FIG. 1, the vehicle is for operation over a liquid surface, or water, and the walls B are rigid depending continuations of the sides 12. However, it is to be understood that when operating over solid terrain the straight bottom edge 15 will operate just above the terrain surface (see FIG. 8), and in practice a flexible semi-rigid curtain 16 will be employed to establish the lower extremity of said wall B.

The means D to pressure the plenum chamber 10 can vary widely, and in the drawings I have illustrated a blower fan 20 at about the center of the vehicle. The fan 20 is of the axial flow type and is on a vertical axis and operating in a vertically disposed duct 21. The fan 20 is rotated by a horizontal prime mover 22 operating through a right angle drive gear 23. It will be apparent that operation of the fan 20 pressurizes the air in the plenum chamber 10, said air being retained under said pressure by the walls B that depend into the water (or close proximity to the ground) and by the seals C and C' later described.

The means E to propel the vehicle can vary widely and in the drawings I have illustrated a screw propeller 25 operable below the water surface. It is to be understood that an air screw operable in the atmosphere can be employed, or any other suitable means of propulsion. As shown, the propeller 25 is incorporated in a conventional drive unit that includes a prime mover 26 and suitable gearing operating through a housing 27 that extends through the bottom 11 and below the water surface. The housing 27 is rotatable or turnable for steerage under control of a pilot.

With the structure thus far described it will be apparent that the vehicle can be supported on an air cushion and maneuvered by the propelling means E. The elongate and straight walls B act in the water as guide fins in order to assure longitudinal motion and substantially eliminating side or lateral drift.

The seals C and C' that close the front and rear of the plenum chamber 10 are essentially alike and each is characterized by a series of depending slats in the form of adjacently related sector-shaped elements. The seal C extends transversely of the body A and depends from a forward extension 30 of the transom 13, while the seal C' extends transversely of the body A and depends from a rear extension 31 of the transom 14. I will first describe the seal C in detail, and which involves, generally, a frame F, a shaft S, and a plurality of slats P. The frame F carries the shaft S that in turn pivotally supports the slats P which are independently operable as later described.

The frame F of the seal C, and that carries the seal elements, can be a rigid frame fixedly secured in the body A. However, it is preferred that provision be made for encountering impact loads that may be imposed when striking an obstacle. Therefore, and in accordance with the preferred form of this invention, the seal C is shiftably suspended and yieldingly held in a normal working position. As shown, the frame F spans the open front end of the vehicle between the opposite walls B, and it is shiftably supported on oppositely projecting trunnions 35, on a common axis, and which are carried in suitable bearings (not actually shown) in the said side walls B. The axis of the bearings and trunnions 35 is at or adjacent the extension 30, the frame F having a transverse member 36 that lies directly beneath the said extension 30. Since the member 36 is to rotate slightly, a flexible seal member 37 extends between the body A and said member 36, whereby air pressures are maintained in the plenum chamber 10. The frame F has a depending leg 38 at opposite sides thereof and at or adjacent the opposite walls B. The legs 38 swing forwardly to a normal vertical stopped position, as shown, and are free to be disposed rearwardly in unison. The frame F has pressure exerting means 39 to yieldingly urge it to said normal position and it is therefore shown with a rearwardly projecting arm or arms 40 engaged by a compression spring 41, or springs, to the end that a downward and forwarding turning moment is applied to the legs 38. Further, the legs 38 are closely placed to the walls B and a suitable flexible seal member 42, or bellows, extends between the legs and walls, respectively, at each side of the vehicle.

The shaft S spans the open front of the vehicle between the legs 38, it being preferred to provide a single pivotal axis and means of support for the series of slats P. It is to be understood that, broadly, it is feasible to individually support each slat P, or to support groups thereof, in which case a plurality of frames F are employed and whereby the axis of each slat, or groups of slats, shifts independently. As shown, there is a single axis of rotation for the series or plurality of slats P, said axis being established by a light weight tubular element that is rigidly extended between the legs 38.

The slats P are employed in multiplicity and in a series spanning the open front of the vehicle between the legs 38, it being preferred to rotatably mount the series of slats P upon a single shaft S so as to have a common axis of rotation. The slats P are sector-shaped elements as above indicated, and each is characterized by its flat semi-disc-shape configuration. Further, the said sector-shaped slats P are rotated on the shaft S in closely spaced planes parallel with each other and normal to the axis of the shaft. Thus, the sector-shaped slats P project and swing radially of the shaft S, and in accordance with the invention they swing rearwardly relative to forward movement of the vehicle.

The slats P are alike, a description of one being sufficient for all, each slat P being sector-shaped or semi-disc-shaped with flat sides 45 in planes normal to the axis of the shaft S. The slat P is freely rotatable on the shaft S through a bearing 46 and it has a rearwardly disposed sector portion with upper and lower sections 47 and 48, and it has a forwardly facing front 49. The upper section 47 is engageable with a seal 50, preferably a labyrinth seal co-extensive with and that depends from the frame member 36, while the lower section 48 is engageable with the surface over which the vehicle is operating. In accordance with the invention, the said sections 47 and 48 are characterized by arcuately curved peripheries, said section 47 having a periphery 51 of lesser radii than the periphery 52 of the section 48. Thus, there is a differential in force applied by air pressure in the plenum chamber 10, resulting in a turning moment that swings the lower section 48 downwardly and forwardly and that swings the upper section 47 upwardly and inwardly. A stop 53 is carried by the frame F and limits upward movement of the section 47 while a stop 54 limits downward movement of the section 48, there being stop bumpers 53' and 54' on the periphery of the sections 47 and 48 where the radii thereof differ, as shown. The lower portion of the front 49 is rearwardly declined in order to have angular engagement with the surface, and the like. The identical and plurality of slats P are closely related to form a stack thereof, with but small space therebetween. The seal 50 that has cooperative engagement with the combined peripheries 51, in effect engages a continuous cylindrical surface formed by the stack of sealing slats P.

The slats P' of the seal C' are substantially like those of the seal C, the seal C' being the same as the first described seal except for the following differences: The seal C' differs in the relative radii of the upper and lower sections 47' and 48' of the rearwardly disposed sector portion. Because the seal C' is at the rear of the forward plenum chamber 10 the effective air pressure radius from within the chamber, in order to effect the proper turning moment, must swing the upper section 47' rearwardly and swing the lower section 48' forwardly. Therefore, the upper section 47' is larger in radius than the lower section 48'. As a result, the lower section 48' with its rearwardly declined front 49' swings downwardly and forwardly to the normal working position that is shown.

Under operating conditions the individual slats P and P' are rotatable to swing as circumstances require, in order to vary the position of the fronts 49 and 49', where said fronts adjoin the peripheries 52 and 52', respectively. In carrying out the invention the slats are light weight structures of hollow or cellular design and having very low inertia values. That is, they are easily and quickly moved and therefore require little energy for very rapid operation. Further, the fronts 49 and 49' are equipped with suitable bumpers 60 and 60', respectively, that absorb impacts and thereby prevent de-formation of the slats P and P' under normal operating conditions.

From the foregoing, the seal element stack is seen to traverse the entire width of the front and rear openings in the vehicle plenum. The disc-like shape provides high stiffness with low mass, and the individually deflectable elements provide minimum inertia per impact, while large adjacent areas allow high differential deflection between elements without increasing leakage of air from the plenum. The cylindrical shape of the stack of seals allows the use of the labyrinth seal between the sealing elements and the plenum roof. By providing low leakage during differential deflection, the seal elements can accommodate constantly fluctuating surfaces without appreciable change in total leakage. Air pressure force balance is an important consideration in the dynamic behavior of the seal that I have provided, since plenum pressure can be made to provide a re-storing moment for the deflected seal elements. Hence, the difference in peripherial radii, as herein above described, is used to advantage in order to bias the individual seal elements. At high forward speed, the slip stream dynamic pressure will produce substantial airloads on the seal elements, and when the free stream stagnation pressure approaches the plenum pressure, the front gap may be allowed to increase so that the seal elements are spaced above the mean water or surface line (since leakage at the front would approach zero). In this latter instance, seal drag would then vanish, and this adjustment is provided automatically with the correct distribution of frontal area as provided for by the difference in radii between the upper and lower sections of the seal elements. It will be apparent that I have provided a practical seal for vehicles of the type under consideration and capable of withstanding usual and ordinary wave loads, minor collisions, and relatively high impact from floating solids, and usual periods of rough handling.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A seal for an opening between the walls of a plenum chamber and for engaging a relatively moving irregular surface extending between said walls, and including, a disc-shaped element rotatable on an axis parallel to said surface and having oppositely projecting sector-shaped sections, one of said sections being a radially larger section, the other of said sections being a radially smaller section and sealed with the plenum structure, the radially larger section being movable to said surface and exposed to air pressure applied radially to one side of the element to turn the element and thereby bias said larger section toward said surface.

2. A seal for an opening between the walls of a plenum chamber and for engaging a relatively moving irregular surface extending between said walls, and including, a disc-shaped element rotatable on an axis parallel to said surface and having oppositely projecting sector-shaped upper and lower sections, said upper section being sealed with the plenum structure, said lower section being radially larger than the upper section and the said lower section movable to said surface and exposed to air pressure applied radially to one side of the element to turn the element and thereby bias said lower section toward said surface.

3. A seal for an opening between the walls of a plenum chamber and for engaging a relatively moving irregular and wide surface extending between said walls, and including, a plurality of adjacent disc-shaped elements and each rotatable on an axis parallel to said surface and each having oppositely projecting sector-shaped sections, one of said sections being a radially larger section, the other of said sections being a radially smaller section and sealed with the plenum structure, the larger sections being movable to said surface and exposed to air pressure applied radially to one side of the elements individually to turn the elements and thereby urge said lower sections thereof toward said surface.

4. A seal for an opening between the walls of a plenum chamber and for engaging a relatively moving irregular surface extending between the walls, and including, a frame shiftably supported at the opening and in a normally operable position, a disc-shaped element rotatable in the frame on an axis parallel to said surface and having oppositely projecting sector-shaped sections, one of said sections being radially larger than the other and the smaller section being sealed with the plenum structure and the larger of said sections movable to said surface, the larger of said sections being exposed to air pressure applied radially to one side of the element to turn the element and said larger section toward said surface.

5. In combination with an air cushion vehicle having depending side walls defining a plenum chamber therebetween and said plenum chamber opening at the end of the vehicle, a seal for said opening and for operation over an irregular supporting surface and including, a disc-shaped element rotatably carried on an axis extending between the side walls and parallel to said surface and having oppositely projecting sector-shaped sections, one of said sections being radially larger than the other and movable to said surface, the larger of said sections being exposed to air pressure in the plenum chamber to turn the element and thereby said larger section toward said surface.

6. In combination with an air cushion vehicle having depending side walls defining a plenum chamber therebetween and said plenum chamber opening at the end of the vehicle, a seal for said opening and for operation over an irregular supporting surface and including, a disc-shaped element rotatably carried on an axis extending between the side walls and parallel to said surface and having oppositely projecting upper and lower sector-shaped sections, said lower section being radially larger than the upper section and movable to said surface, the lower section being exposed to air pressure in the plenum chamber to turn the element and thereby said lower section toward said surface.

7. In combination with an air cushion vehicle having depending side walls defining a plenum chamber therebetween and said plenum chamber opening at the end of the vehicle, a seal for said opening and for operation over an irregular supporting surface and including, a plurality of adjacent disc-shaped elements carried on an axis extending between the side walls and parallel to said surface and each having oppositely projecting sector-shaped sections, one of said sections being radially larger than the other and movable to said surface, the larger of said sections being exposed to air pressure in the plenum chamber to turn the element and thereby said larger sections toward said surface.

8. In combination with an air cushion vehicle having depending side walls defining a plenum chamber therebetween and said plenum chamber opening at the end of the vehicle, a seal for said opening and for operating over an irregular supporting surface and including, a frame and means to shiftably support the frame between said walls and normally in an operable position, a disc-shaped element rotatably carried by the frame on an axis parallel to said surface and having oppositely projecting sector-shaped sections, one of said sections being radially larger than the other and movable to said surface, whereby air pressure in the plenum chamber biases said larger section to rotate toward said surface.

9. In combination with an air cushion vehicle having depending side walls defining a plenum chamber therebetween and said plenum chamber opening at the end of the vehicle, a seal for said opening and for operating over an irregular supporting surface and including, a frame and parallel to said surface and each having opposaid walls and normally in an operable position, a plurality of adjacent disc-shaped elements carried by the frame and parallel to said surface and each having oppositely projecting sector-shaped sections, one of said sections being radially larger than the other and movable to said surface, whereby air pressure in the plenum chamber biases said larger sections rotatably toward said surface.

10. In combination with an air cushion vehicle having depending side walls defining a plenum chamber therebetween and said plenum chamber opening at the front and rear ends of the vehicle, a seal for each of said openings and for operation over an irregular supporting surface and each including, a frame and means to shiftably support the frame between said walls and normally in an operable position, a disc-shaped element rotatably carried by the frame on an axis parallel to said surface and having oppositely projecting sector-shaped sections, one of said sections being radially larger than the other and movable to said surface, whereby air pressure in the plenum chamber biases said larger section to rotate toward said surface.

11. In combiation with an air cushion vehicle having depending side walls defining a plenum chamber therebetween and said plenum chamber opening at the front and rear ends of the vehicle, a seal for said front opening and for operation over an irregular supporting surface and including, a disc-shaped element rotatably carried on an axis extending between the side walls and parallel to said surface and having oppositely projecting upper and lower sector-shaped sections, said lower section being radially larger than the said upper section and said lower section being movable to said surface, a seal for said rear opening and for operation over an irregular supporting surface and including, a disc-shaped element rotatably carried on an axis extending between the side walls and parallel to said surface and having oppositely projecting upper and lower sector-shaped sections, said upper section being radially larger than the said lower section and said lower section being movable to said surface, both the upper and the lower section being exposed to air pressure in the plenum chamber and the larger section overbalancing the other, respectively, to turn the elements to said respective lower sections toward said surface.

12. In combination with an air cushion vehicle having depending side walls defining a plenum chamber therebetween and said plenum chamber opening at the front and rear ends of the vehicle, a seal for said front opening and for operation over an irregular supporting surface and including a plurality of adjacent disc-shaped elements rotatably carried on an axis extending between the side walls and parallel to said surface and having oppositely projecting upper and lower sections, said lower section being radially larger than the said upper section and movable to said surface, a seal for said rear opening and for operation over an irregular supporting surface and including a plurality of adjacent disc-shaped elements rotatably carried on an axis extending between the side walls and parallel to said surfaces and having oppositely projecting upper and lower sector-shaped sections, said upper section being radially larger than the said lower section and said lower section being movable to said surface, both the lower and the upper section being exposed to air pressure in the plenum chamber and the larger section overbalancing the other, respectively, to turn the elements to said respective lower sections toward said surface.

References Cited by the Examiner

UNITED STATES PATENTS

| | | | |
|---|---|---|---|
| 1,698,482 | 1/29 | Nicin | 180—1 |
| 2,387,627 | 10/45 | Warner | 180—7 |
| 2,444,318 | 6/48 | Warner | 180—1 |
| 3,027,860 | 4/62 | Priest | 180—7 |
| 3,055,446 | 9/62 | Vaughen | 180—7 |
| 3,066,753 | 12/62 | Hurley et al. | 180—7 |

OTHER REFERENCES

"Science and Mechanics," June 1960, pages 73, 74, 75, 76, and 77.

FERGUS S. MIDDLETON, *Primary Examiner.*

PHILIP ARNOLD, A. HARRY LEVY, MILTON BUCHLER, *Examiners.*